US008305959B2

(12) United States Patent
Berzin

(10) Patent No.: US 8,305,959 B2
(45) Date of Patent: Nov. 6, 2012

(54) HIERARCHICAL MOBILITY LABEL-BASED NETWORK

(75) Inventor: Oleg L Berzin, Huntingdon Valley, PA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 648 days.

(21) Appl. No.: 12/241,797

(22) Filed: Sep. 30, 2008

(65) Prior Publication Data

US 2010/0080169 A1 Apr. 1, 2010

(51) Int. Cl.
*H04W 4/00* (2009.01)
(52) U.S. Cl. ......... 370/328; 370/331
(58) Field of Classification Search .......... 370/331, 370/328
See application file for complete search history.

(56) References Cited

U.S. PATENT DOCUMENTS

| | | | | |
|---|---|---|---|---|
| 7,126,907 | B2 * | 10/2006 | Carpini et al. | 370/218 |
| 7,227,863 | B1 * | 6/2007 | Leung et al. | 370/390 |
| 7,415,512 | B1 * | 8/2008 | Moon | 709/220 |
| 2006/0133265 | A1 | 6/2006 | Lee | |
| 2007/0076732 | A1 * | 4/2007 | Kim | 370/409 |
| 2008/0130571 | A1 * | 6/2008 | Maeda et al. | 370/331 |
| 2008/0170578 | A1 * | 7/2008 | Ould-Brahim | 370/401 |

FOREIGN PATENT DOCUMENTS

WO WO-2005/096556 10/2005

OTHER PUBLICATIONS

Berzin et al: "Mobility label based network: Hierarchical mobility management and packet forwarding architecture", Computer Networks, Elsevier Science Publishers B.V., Amsterdam, NL, vol. 53, No. 12, Aug. 13, 2009, pp. 2153-2181.
Berzin et al: "Mobility label based network: Mobility support in label switched networks with multi-protocol BGP", Computer Networks, Elsevier Science Publishers B.V., Amsterdam, NL, vol. 52, No. 9, Jun. 26, 2008, pp. 1732-1744.
Draft-Berzin-Malis-MPLS-Mobility-01.txt, Internet Ngineering Task Force, IETF; Standardworkingdraft, Internet Society (ISOC) 4, Rue Des Falaises CH-1285 Geneva, Switzerland, No. 1, Apr. 28, 2008.
Vassiliou V et al: "M-MPLS: micromobility-enabled multiprotocol label switching", 2003 IEEE International Conference on Communications; ICC 2003; May 11-15, 2003, vol. 1, pp. 250-255.
EPO Extended Search Report Issued in App. No. 09818369.2 on May 15, 2012, which is a foreign counterpart application of the above-identified application.

* cited by examiner

*Primary Examiner* — Jeffrey Pwu
*Assistant Examiner* — Majid Esmaeilian

(57) ABSTRACT

A system includes a label edge router associated with a geographical region, an area label edge router associated with an area that includes the region, and a route reflector associated with the area. The label edge router registers a first mobile node, creates a mobility binding for the first mobile node, and sends a first internal update message that includes the mobility binding. The area label edge router receives a second internal update message that carries contents of the first internal update message, updates a forwarding information base based on the second internal update message to establish a first label switched path, and sends an external update message. The route reflector receives the first internal update message, sends the second internal update message to the area label edge router, and receives the external update message from the area label edge router.

19 Claims, 11 Drawing Sheets

HIERARCHICAL MOBILITY LABEL-BASED NETWORK

BACKGROUND

In a Mobile Internet Protocol (IP) network, a mobile node (MN) may enter a foreign subnet, discover a foreign agent (FA) node by listening to Internet Control Message Protocol (ICMP) messages, and register itself with the FA node and a home agent (HA) node. The FA node may include a router coupled to the subnet in which the MN is currently located, and the HA node may include a router coupled to a home subnet to which the MN is assigned.

Upon successful registration of the MN, a remote node, which intends to communicate with the MN, may forward messages to the HA node. The HA node may encapsulate and tunnel the messages to the FA node, which, in turn, may relay the messages to the MN using a layer 2 network. In the reverse direction, messages from the MN may be sent directly to the remote node.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

The term "edge router," as used herein, may refer to a router that is placed at the edge of a network. As used herein, the term "mobility label" may refer to a Multi-Protocol Label Switched (MPLS) label that designates a mobile node or a mobile router.

Figure 1:
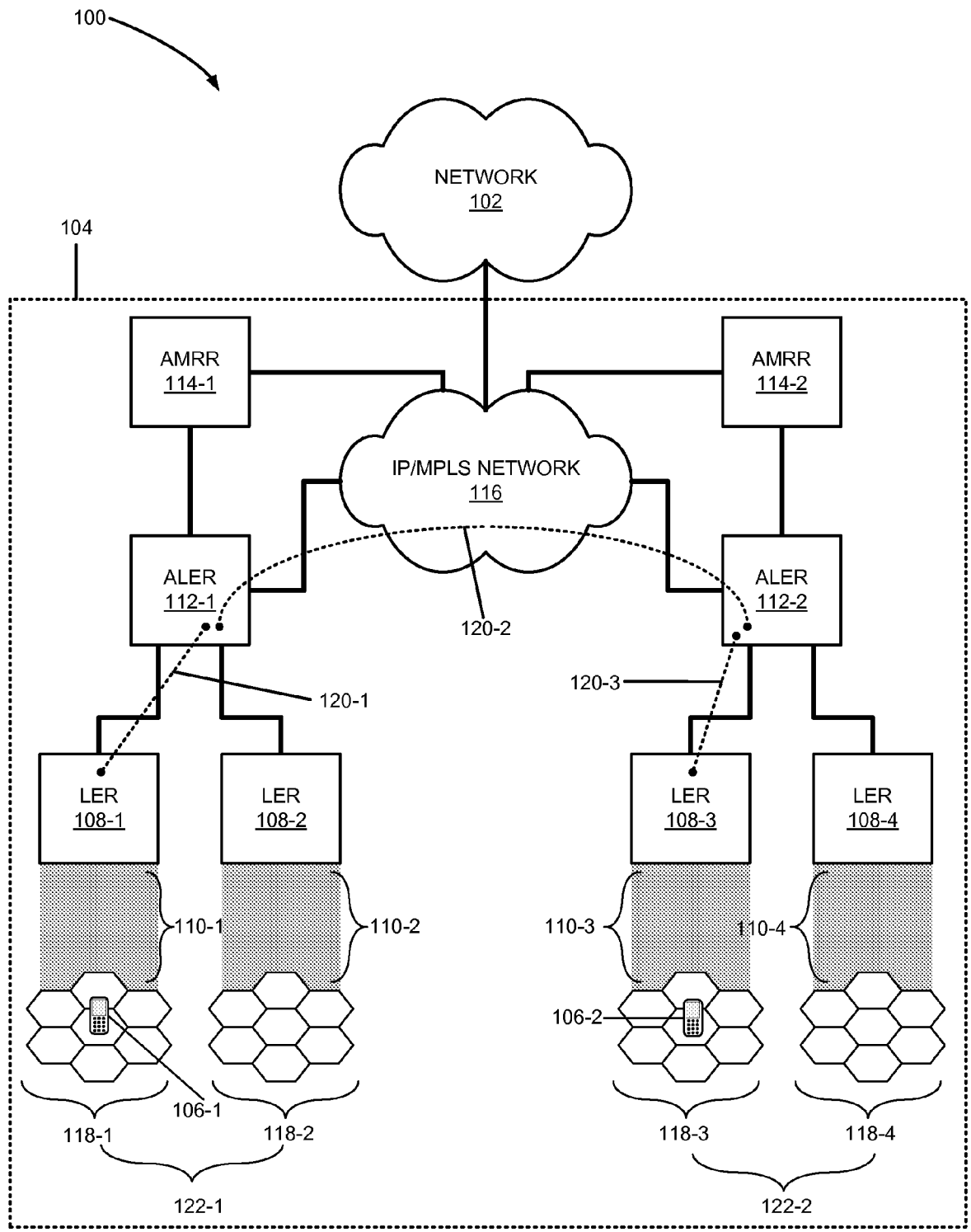
FIG. 1 is a diagram of an exemplary network in which concepts described herein may be implemented.

FIG. 1 is a diagram of an exemplary network 100 in which concepts described herein may be implemented. As shown, network 100 may include a network 102 and a hierarchical mobility label-based network (MLBN) 104. Network 102 may include the Internet, an intranet, a local area network (LAN), a wide area network (WAN), a metropolitan area network (MAN), a cellular network, a public switched telephone network (PSTN), an ad hoc network, any other network, or a combination of one or more networks.

As further shown, hierarchical MLBN 104 may include mobile nodes 106-1 and 106-2 (collectively referred to herein as "mobile nodes 106" and individually as "mobile node 106-x"), label edge routers (LERs) 108-1 through 108-4 (collectively referred to herein as "LERs 108" and individually as "LER 108-x"), layer 2 (L2) grooming networks 110-1 through 110-4 (collectively referred to herein as "L2 grooming networks 110" and individually as "L2 grooming network 110-x"), area LERs (ALERs) 112-1 and 112-2 (collectively referred to herein as "ALERs 112" and individually as "ALER 112-x"), area mobility route reflectors (AMRRs) 114-1 and 114-2 (collectively referred to herein as "AMRRs 114" and individually as "AMRR 114-x"), and an Internet Protocol (IP)/multi-protocol label switched (MPLS) network 116. Depending on the implementation, hierarchical MLBN 104 may include additional, fewer, or different components than those illustrated in FIG. 1. For example, hierarchical MLBN 104 may include additional mobile nodes, L2 grooming networks, ALERs, etc.

Mobile node 106-x may include any of the following devices: a mobile router; a mobile computer; an electronic notepad or a laptop computer; a mobile telephone, such as a radio telephone; an IP phone; a personal communications system (PCS) terminal; a personal digital assistant (PDA); a pager; and/or any other type of communication device with that can participate in a wireless or wire network communication. In FIG. 1, mobile node 106-1 may communicate with mobile node 106-2 via network elements (e.g., LERs 108, ALERs 112, etc.) in hierarchical MLBN 104.

LER 108-x may include a device (e.g., an edge router, a gateway, a switch, etc.) that provides an entry to and/or an exit from hierarchical MLBN 104. LER 108-x may provide signaling and/or forwarding functions that are associated with edge routers of MPLS networks. In addition, LER 108-x may be associated with a geographical region 118-x, and may provide communication services, known as mobility support functions (MSFs), to mobile nodes 106 that are within region 118-x. For example, LER 108-1 may provide the MSFs to mobile node 106-1 while mobile node 106-1 is within region 118-1.

L2 grooming network 110-x may include one or more Radio Access Networks (RANs). L2 grooming network 110-x may aggregate signals from one or more wireless access points and may send the aggregated signals to LER 108-x. For example, L2 grooming network 110-1 may aggregate signals from wireless access points in region 118-1 and may send them to LER 108-1.

ALER 112-x may include a device (e.g., an edge router, a gateway, a switch, etc.) for performing label edge router functions on behalf of LERs 108. For example, ALER 112-1 may perform LER functions on behalf of LER 108-1 and 108-2. ALER 112-x that performs label edge routing functions for LERs 108 may be said to "aggregate" LERs 108. In FIG. 1, for example, ALER 112-2 may aggregate LER 108-3 and LER 108-4. In aggregating one or more LERs 108, ALER 112-x may perform signaling functions (e.g., exchanging routing information), forwarding functions (e.g., relay packets to/from LERs 108), and MSFs.

AMRR 114-x may include a device (e.g., reflector) that peers with ALERs 106, LERs 108, and other AMRRs 114. AMRR 114-x may receive routing information from a peer and distribute the routing information to other peers in network 100. When AMRR 114-*x* transmits the same routing information that AMRR 114-*x* has received, it may be said AMRR 114-*x* "reflects" the routing information.

In some implementations, AMRR 114-*x* may distribute or reflect the routing information based on demand, after an explicit request from a peer. In these implementations, AMRR 114-*x* may not forward packets. In other implementations, functionalities of AMRR 114-*x* may be incorporated in ALER 112-*x*. Such implementations may avoid signaling between AMRRs 114 and/or other devices, while increasing processing load on ALERs 112.

IP/MPLS network 116 may include devices and/or systems that provide routing/switching of packets based on router identifiers, known as labels, and/or IP addresses.

Regions 118-1 through 118-4 (collectively referred to herein as "regions 118" and individually referred to herein as "region 118-*x*") may include geographical or physical regions. Each region 118-*x* may include cells, each of which may be associated with a particular RAN.

As shown in FIG. 1, ALER 112-*x* may cover a geographical area called a mobility area, or simply an area, which may include a union of regions covered by LERs 108 that ALER 112 aggregates. For example, ALER 112-1 may correspond to an area 122-1, which may include regions 118-1 and 118-2, and ALER 112-2 may correspond to an area 122-2, which may include regions 118-3 and 118-4. In addition, each ALER 112-*x* may correspond to AMRR 114-*x*, which may cover the same area that corresponding ALER 112-*x* covers. For example, ALERs 112-1 and 112-2 may correspond to AMRRs 114-1 and 114-2, respectively. In addition, AMRRs 114-1 and 114-2 may cover areas 122-1 and 122-2, respectively. Area 122-*x* (e.g., area 122-1) and network devices that cover area 122-*x* (e.g., ALER 112-1 and AMRR 114-1) may be associated with an identifier (e.g., an area ID) that uniquely identifies area 122-*x*.

In FIG. 1, when mobile node 106-*x* moves to a particular geographical location, mobile node 106-*x* may perform a search for a device/router that provides MSFs, which will be described below in greater detail. If it is assumed that LER 108-*x* provides the MSFs and mobile node 106-*x* is able to locate LER 108-*x*, mobile node 106-*x* may register itself with LER 108-*x*.

Once the registration is complete, LER 108-*x* may signal routing information for mobile node 106-*x* to other devices in hierarchical MLBN 104 based on a routing protocol. More specifically, LERs 108 may exchange IP addresses and mobility labels associated with mobile node 106-*x* with ALERs 112 and AMRRs 114, which may exchange the routing information with one another. Upon completion of the signaling, mobile node 106-*x* may communicate with one or more mobile nodes over hierarchical MLBN 104.

Hierarchical MLBN 104 may provide scalability and efficiency in mobile communications. With ALERs 112 aggregating LERs 108 and AMRRs 114 reflecting signaling information, LERs 108 may not be fully meshed, and therefore, may not exchange as many signaling messages as, for example, some non-hierarchical networks (e.g., Mobile Internet Protocol (IP)) network), when establishing routes between mobile nodes 106.

As shown in FIG. 1, hierarchical MLBN 104 may establish a route between LER 108-1 and LER 108-3 before hierarchical MLBN 104 can forward packets from mobile node 106-1 to mobile node 106-2. The route may include a label switched path (LSP) 120-1, a LSP 120-2, and a LSP 120-3 (collectively referred to herein as either "LSPs 120" or "LSP 120" and individually as "LSP 120-*x*"). In some situations, because each LSP 120-*x* may be relatively independent of other LSPs 120, when a particular LSP 120-*x* is modified, nodes involved in establishing other LSPs 120 may not need to be updated with routing/path information. This may allow hierarchical MLBN 104 to further reduce a number of signaling messages for modifying LSPs, and, therefore, may enable hierarchical MLBN 104 to be scalable and efficient.

Figure 2:
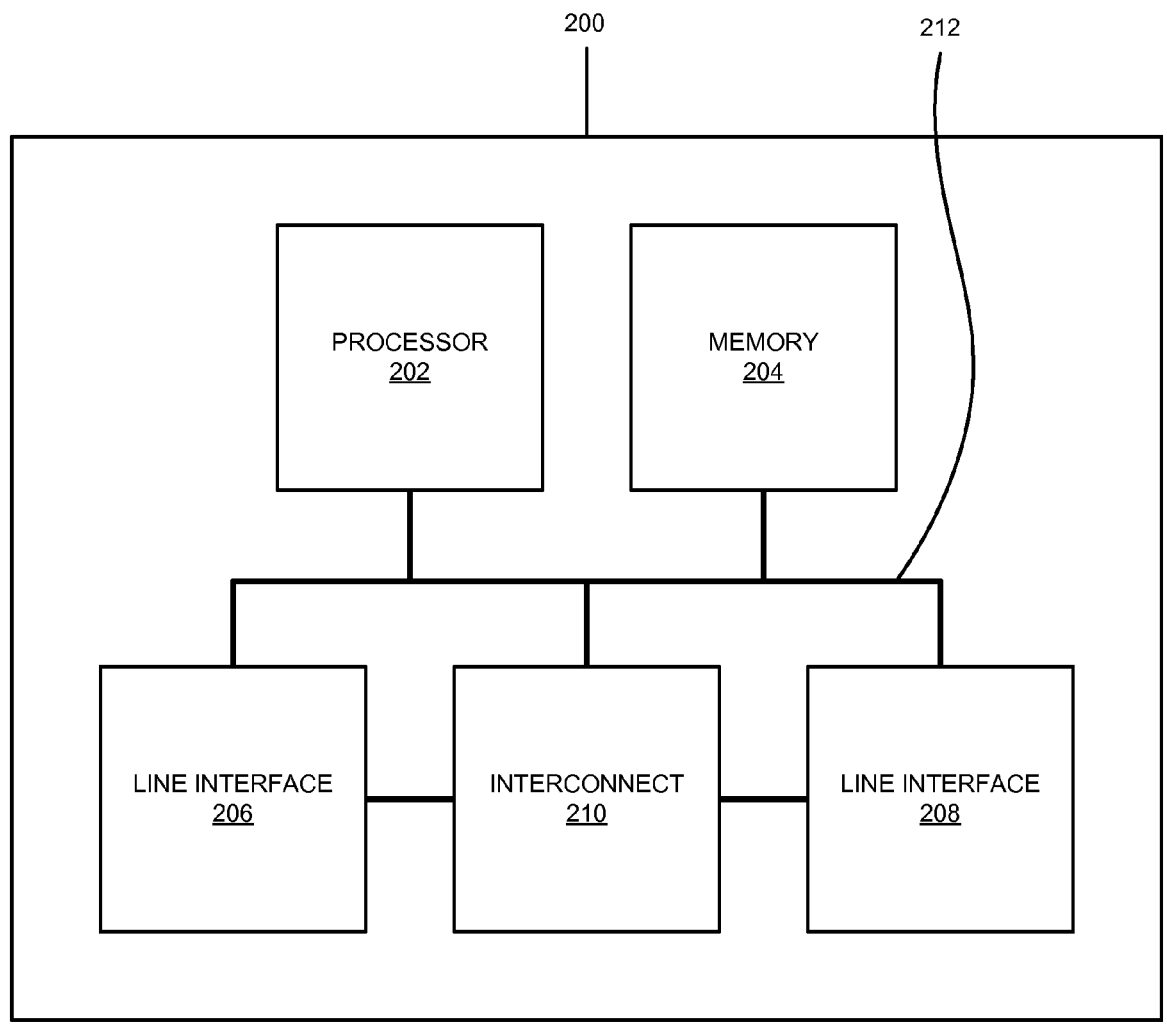
FIG. 2 is a block diagram of an exemplary network device of FIG. 1.

FIG. 2 is a block diagram of a network device 200, which may correspond to LER 108-*x*, ALER 112-*x*, and/or AMRR 114-*x*. As shown, network device 200 may include a processor 202, a memory 204, line interfaces 206 and 208, an interconnect 210, and communication paths 212. In different implementations, network device 200 may include additional, fewer, or different components than the ones illustrated in FIG. 2. For example, in one implementation, network device 200 may include additional line interfaces.

Processor 202 may include one or more processors, microprocessors, and/or processing logic optimized for networking and communications. Processor 202 may process packets and/or network path-related information.

Memory 204 may include static memory, such as read only memory (ROM), dynamic memory, such as random access memory (RAM), and/or onboard cache, for storing data and machine-readable instructions. In some implementations, memory 204 may also include storage devices, such as a hard disk, as well as other types of storage devices.

Line interfaces 206 and 208 may include components for receiving incoming packets from devices and/or elements in hierarchical MLBN 104 and for transmitting packets to other devices/elements in hierarchical MLBN 104. Interconnect 210 may include switches for conveying a packet from line interface 206 to line interface 208, and vice versa. Examples of interconnect 210 may include a communication bus or a switch fabric. Communication paths 212 may provide an interface through which components of network device 200 can communicate with one another.

Figure 3:
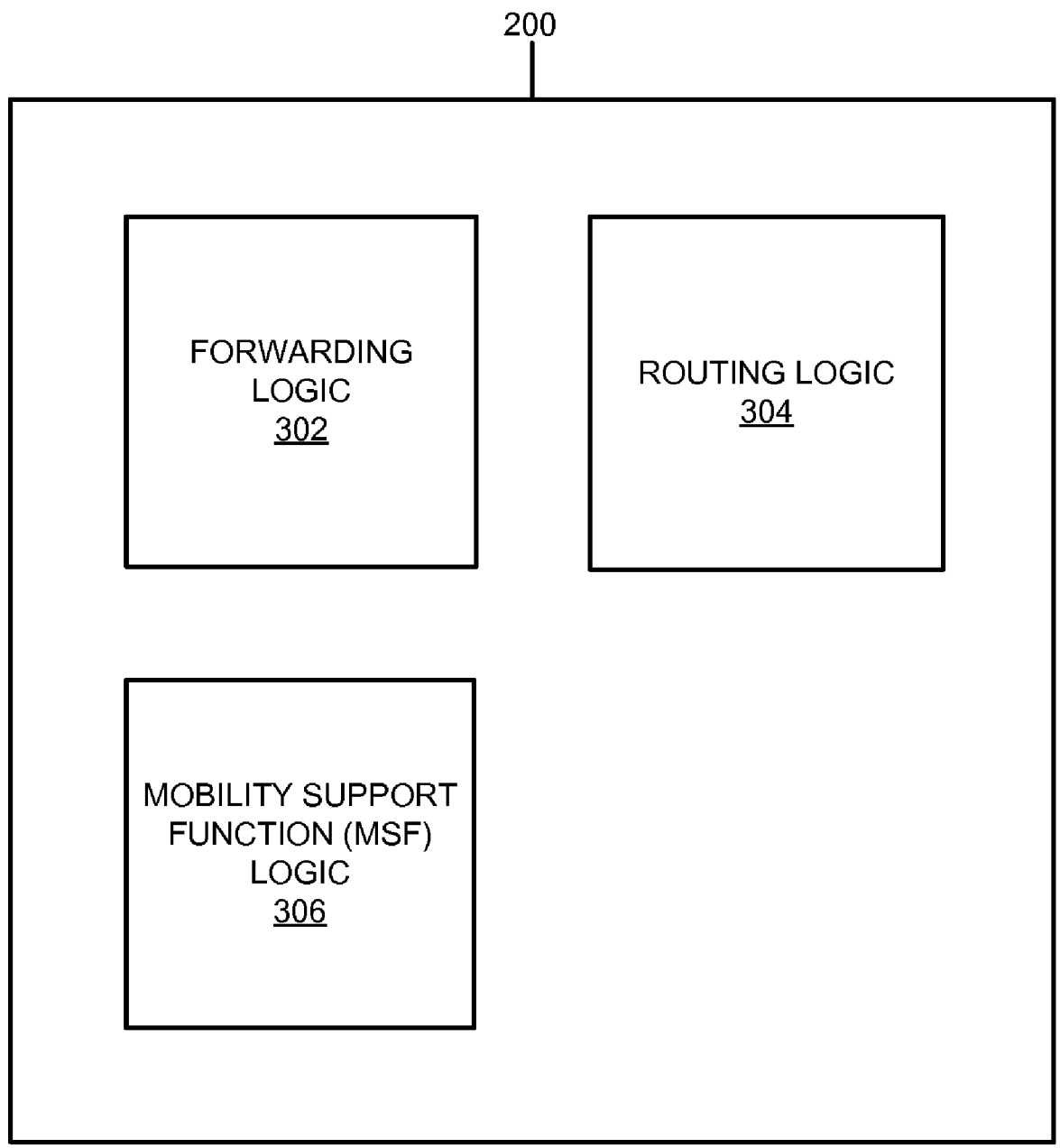
FIG. 3 is a functional block diagram of the exemplary network device of FIG. 2.

FIG. 3 is a functional block diagram of exemplary network device 200. As shown, network device 200 may include forwarding logic 302, routing logic 304, and Mobility Support Function (MSF) logic 306. Depending on the implementation, network device 200 may include fewer, additional, or different functional components than those illustrated in FIG. 3. For example, if network device 200 is implemented as AMRR 114-*x*, network device 200 may not necessarily include forwarding logic 302.

Forwarding logic 302 may include hardware and/or software for routing packets toward their destination devices over hierarchical MLBN 104. In hierarchical MLBN 104, a network route that a packet follows as the result of being forwarded by forwarding logic 302 in various routers may be referred to as a label switched path (LSP). To route a packet along the LSP, forwarding logic 302 may direct a packet to a proper output port on a line interface of network device 200 based on the packer header.

In addition to forwarding the packet, forwarding logic 302 may perform various procedures on the packet header, depending on whether its host router is implemented as LER 108-*x*, ALER 112-*x*, and/or a label switch router (LSR) (not shown). If the host router is implemented as LER 108-*x*, forwarding logic 302 may convert a packet that enters hierarchical MLBN 104 into a MPLS packet, by adding a MPLS header to the packet and/or a MPLS label (e.g., a mobility label) that identifies the mobile node registered at originating LER 108-*x*. Conversely, forwarding logic 302 may convert a MPLS packet that exits hierarchical MLBN network 106 by stripping away its MPLS header, including both the outer label and the mobility label.

If the host router operates as a LSR or ALER 112-*x*, forwarding logic 302 may perform an operation on the MPLS header (e.g., a mobility label) of a received packet. The operation may include creating another MPLS label and inserting it next to the original MPLS label, swapping the MPLS label for another MPLS label, and/or removing the MPLS label and/or the MPLS header. Because an outermost MPLS label in the MPLS header may designate the next-hop router, an operation that affects the label may also modify the identity of the next-hop router and the LSP.

Routing logic 304 may include hardware and/or software for communicating with other routers to gather and store routing information. Routing logic 304 may enforce a specific set of procedures for communicating routing messages (e.g., label distribution protocol (LDP) messages, constraint-based routing LDP messages, Multi-Protocol (MP)-Border Gateway Protocol (BGP) messages, etc.). Through the exchange of the routing messages, network device 200 may manage routing information.

In managing the routing information, routing logic 304 may provide a function that may include an inter-domain control plane that overlays a MPLS control plane of hierarchical MLBN 104. The inter-domain control plane may be responsible for the inter-domain network distribution and/or withdrawal of MPLS labels (e.g., mobility labels) that are assigned to mobile nodes. The distribution of MPLS labels may establish/remove a network route/path (e.g., LSP) within hierarchical MLBN 104.

In providing the inter-domain control plane functions, routing logic 304 may employ an inter-domain routing/signaling protocol to exchange messages with other devices, such as LER 108-*x*, ALER 112-*x*, and AMRR 114-*x*. For example, routine logic 304 may use MP-BGP to propagate mobility labels from AMRR 114-*x* to other AMRRs 114.

MSF logic 306 may include hardware and/or software for supporting mobile node 106-*x*. MSF logic 306 may permit network device 200 (e.g., mobile node 106-*x*) to discover another device (e.g., another network device 200) that includes MSF logic 306 and to register mobile node 106-*x* at the other device. Mobile node 106-*x* may initiate the discovery by sending a layer 2 multicast discovery signal or a solicitation message. Upon discovery of another network device 200 with MSF logic 306, mobile node 106-*x* may register itself at another network device 200, by sending a series of messages to another network device 200. The messages may convey various networking parameters, such as an identifier for mobile node 106-*x*, an IP address, a priority level of transport service, a an area ID, etc.

MSF logic 306 may associate/de-associate an IP address or a prefix of mobile node 106-*x* with a mobility label. For example, MSF logic 306 may associate and de-associate (e.g., bind/unbind) a mobility label with an identifier of a line interface (e.g., line interface 208) via which packets from mobile node 106-1 are received, an IP address of mobile node 106-1, and/or a prefix for a range of IP addresses of mobile node 106-*x*. The association may include, in addition to layer 3 information (e.g., IP address), information that may be specific to layer 2 (e.g., layer 2 header information).

MSF logic 306 may participate in propagating routing information for mobile node 106-*x* across inter-domain routers. In one implementation, MSF logic 306 may employ routing logic 304, which in turn, may employ MP-BGP to propagate the routing information.

In the above, network device 200 may exchange and manage, via routing logic 304 and MSF logic 306, the routing information for mobile nodes 106. Network device 200 may store the routing information for mobile nodes in a forwarding information base (FIB).

Figure 4:
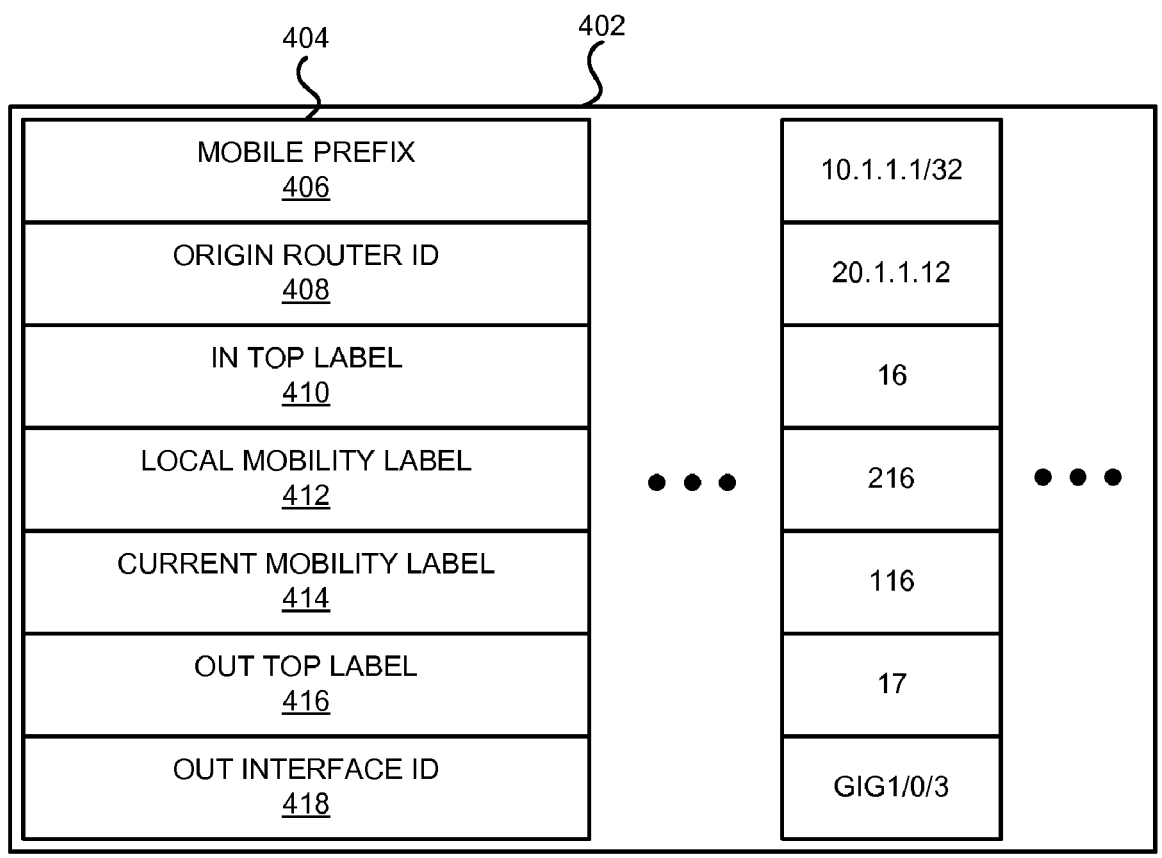
FIG. 4 shows a diagram of an exemplary forwarding information base (FIB) of the network device of FIG. 3.

FIG. 4 illustrates a diagram of an exemplary FIB 402 that may be included in and/or managed by network device 200 (e.g., in memory 204). FIB 402 may include one or more FIB records, one of which is shown in FIG. 4 as FIB record 404. When a packet arrives at network device 200 (e.g., ALER 112-*x*), network device 200 may retrieve FIB record 404 by matching one or more fields in FIB record 404 to part of the packet's MPLS header. Furthermore, network device 200 may use information provided in retrieved FIB record 404 to forward the packet.

As shown in FIG. 4, FIB record 404 may include a Mobile Prefix field 406, an Origin Router Identifier (ID) field 408, an In Top Label field 410, a Local Mobility Label field 412, a Current Mobility Label field 414, an Out Top Label field 416, and an Out Interface field 418. Depending on the implementation, FIB record 404 may include fewer, additional, or different fields than the ones illustrated in FIG. 4.

Mobile Prefix field 406 may include an address prefix (e.g., "10.1.1.1/32") that may be associated with a forwarding equivalency class (FEC). When a packet arrives at network device 200 and the packet belongs to the FEC specified by Mobile Prefix field 406 in FIB record 404, network device 200 may forward the packet in accordance with FIB record 404, as further described below.

Origin Router ID field 408 may include an identifier that is associated with an edge router from which the mobility binding update for the mobile prefix in question may have been sent. For example, Origin Router ID field 408 may include a value (e.g., "20.1.1.12") that provides an address of an edge router that sourced the mobility binding update for the mobile prefix in question (e.g., "10.1.1.1/32").

In Top Label field 410 may include a top or outermost MPLS label of the packet. For example, In Top Label field 410 may include a value (e.g., "16") associated with a top or outermost MPLS label of the packet.

Local Mobility Label field 412 may include a mobility label. For example, Local Mobility Label field 412 may include a value (e.g., "216") associated with a mobility label. To retrieve FIB record 404 in FIB 402, network device 200 may match a mobility label in the packet to the value of Local Mobility Label field 412.

Current Mobility Label field 414 may include a mobility label that may replace the mobility label on the packet when the packet enters a new LSP at network device 20. For example, Current Mobility Label field 414 may include a value (e.g., "116") associated with the replacement mobility label. Typically, a mobility label on a packet may be swapped in place of another mobility label when the packet enters or exits a LSP, such as LSP 120-1, LSP 120-2, or LSP 120-3, at an edge router (e.g., LER 108-1, ALER 112-1, etc.) at the start or the end of the LSP.

Out Top Label field 416 may include a label that may be swapped in place of the top label of the packet by forwarding logic 302. For example, Out Top Label field 416 may include a value (e.g., "17") associated with the swapped label.

Out Interface field 418 may include a name of line interface via which the packet may leave network device 200. For example, Out Interface field 418 may include a value (e.g., "GIG1/0/3") that provides an address of the line interface.

In FIB record 404, In Top Label field 410 and Out Top Label field 416 may contain MPLS labels that may be associated with routers (e.g., LER 108, ALER 112, etc.). Local Mobility Label field 412 and Current Mobility Label field 414 may contain mobility labels that may have been used in signaling route information for mobile nodes 106 and for forwarding packets to/from mobile nodes 106.

The above paragraphs describe system elements that may be related to devices and/or components in hierarchical MLBN 104. FIGS. 5A through 10B show or illustrate exemplary processes that may be performed by one or more of these devices and/or components. The processes may pertain to establishing LSP 120, forwarding packets over LSP 120, and/or removing LSP 120.

Figure 5A:
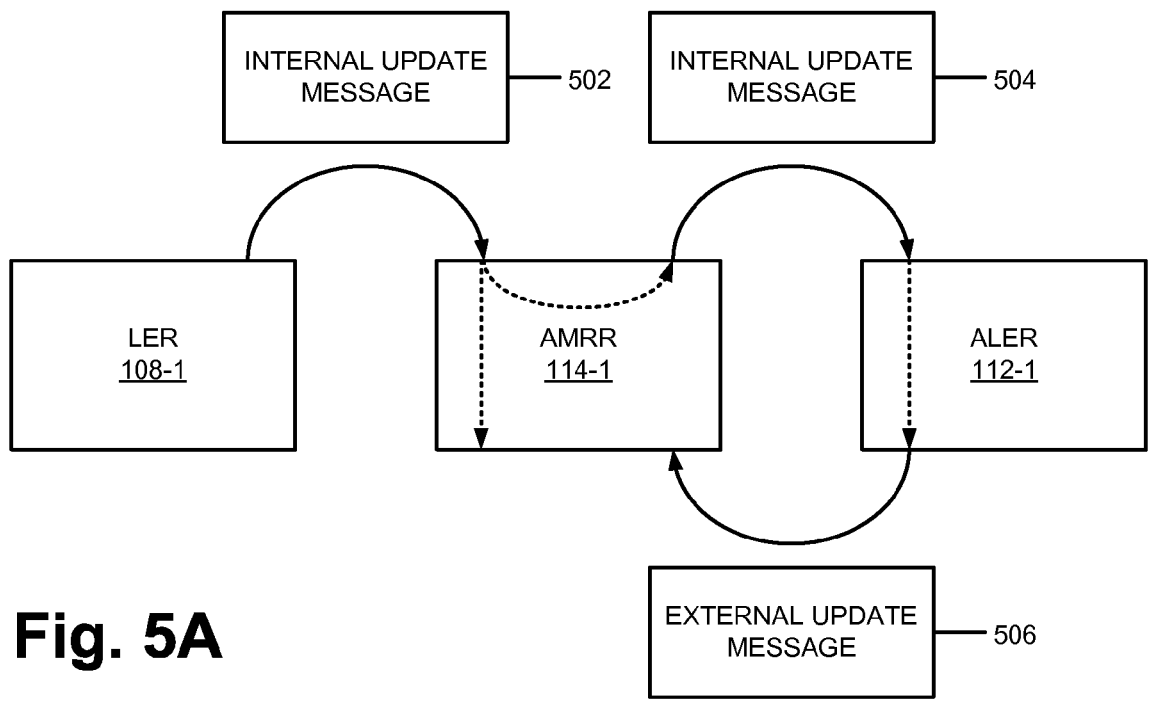
FIGS. 5A and 5B illustrate an internal update process and an external update process.
Figure 5B:
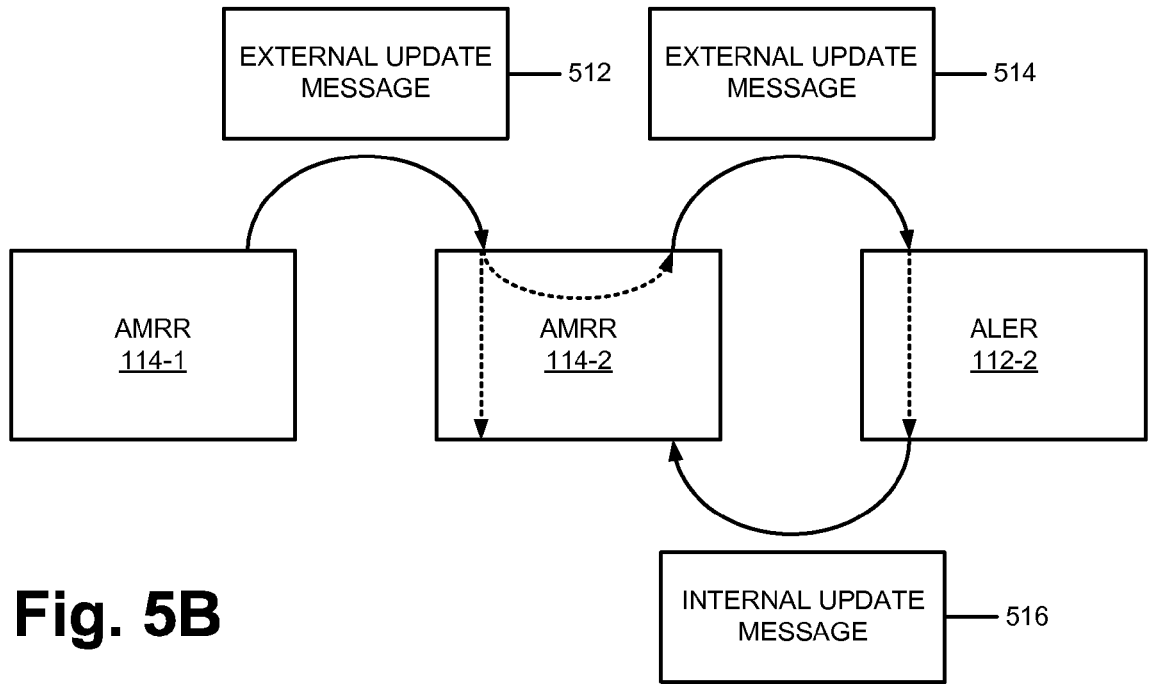

FIGS. 5A and 5B illustrate exemplary processes, also referred to herein as an "internal update" process and an "external update" process. As explained below, the internal update process and the external update process may be performed within the exemplary processes in FIGS. 6, 7, and/or 8. The internal and external update processes may occur when device 200 initiates updates in routing information at network devices of hierarchical MLBN 104. The updates may be necessary to establish a LSP, and accommodate route changes that occur as a result of handing-off mobile node 106-*x* between different RANs or as a result of terminating a communication session between mobile nodes 106.

As shown in FIG. 5A, LER 108-1 may initiate an internal update process by sending an internal update message 502 to AMRR 114-1. Internal update message 502 may include a mobility binding (e.g., an association between a mobility label and mobile node 106-*x*, a router ID of LER 108-*x*, an area ID, etc.). Upon receiving internal update message 502, AMRR 114-1 may perform updates to its routing information base and may issue an internal update message 504 to ALER 112-1. Internal update message 504 may include the same or similar information as internal update message 502.

In response to internal update message 504, ALER 112-1 may update its routing/forwarding information base (e.g., FIB 402), and may send an external update message 506 to AMRR 114-1. External update message 506 may include an identifier for ALER 112-1 and a mobility label, known as a Local Mobility Label. To devices that cover regions/areas outside area 122-1, the Local Mobility Label may operate as a proxy label that represents the original mobility label in area 122-1. For example, assume that a mobility label for mobile node 106-1 is "24." If Local Mobility Label is "36" at AMRR 114-1, Local Mobility Label "36" may serve as a proxy for label "24" to AMRR 114-2 or ALER 112-2.

FIG. 5B illustrates an external update process. As illustrated, external update process may begin with AMRR 114-1 issuing an external update message 512 to other AMRRs, such as AMRR 114-2. External update message 512 may include a mobility binding created by ALER 112-1. The mobility binding, in turn, may include information that is local to ALER 112-1, such as a router ID of ALER 112-1 (e.g., ALER 112-*x* that initiated the external update) and a mobility label (e.g., a Local Mobility Label) that ALER 112-1 assigned to mobile node 106-1.

Upon receiving external update message 512, AMRR 114-2 may provide the mobility binding included in the external update message 512 to ALER 112-2, via an external update message 514. External update message 514 may include the same or similar information as external update message 512.

In response to external update message 514, ALER 112-2 may update its routing/forwarding information base (e.g., FIB 402), and may send an internal update message 516 to AMRR 114-2. Internal update message 516 may include an identifier for ALER 112-2 and a Local Mobility Label.

In FIG. 5A, the internal update process is illustrated as starting at LER 108-1 and propagating to AMRR 114-1 and then to ALER 112-1. In general, an internal update process which starts at a LER for a given region may propagate to an AMRR and ALER that cover an area including the region. Similarly, in FIG. 5B, the external update process is illustrated as starting at AMRR 114-1 and propagating to AMRR 114-2 and ALER 112-2. In general, an external update process which starts at an AMRR for an area may propagate to other AMRRs and ALERs that do not cover the area.

Figure 6:
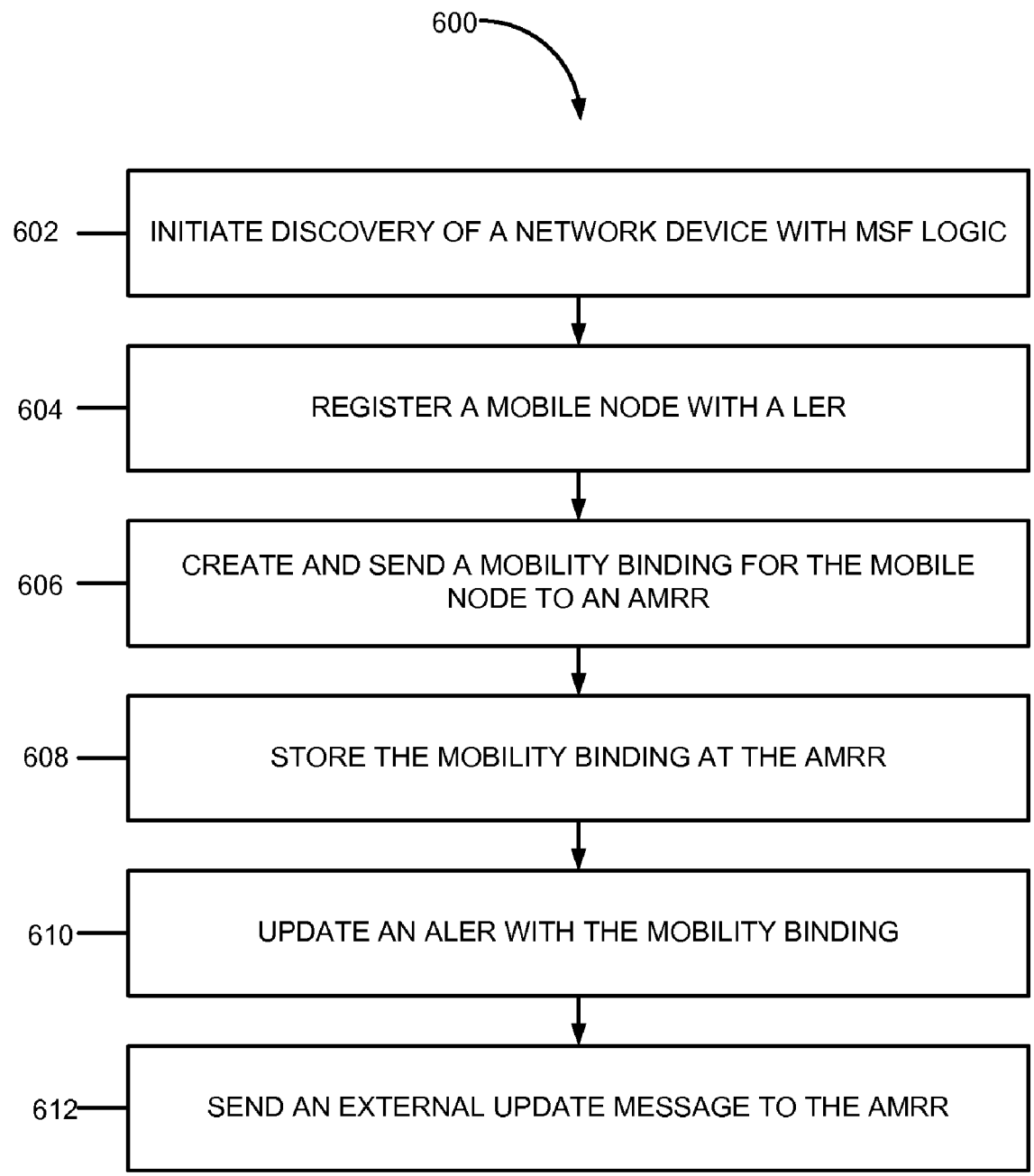
FIG. 6 is a flow diagram of an exemplary process for establishing an exemplary label switched path (LSP) of FIG. 1.

FIG. 6 is a flow diagram of an exemplary process 600 for establishing LSP 120-1 (e.g., a portion of LSP 120). Process 600 may include an internal update process, which is described above in connection with FIG. 5A.

Process 600 may begin with initiation of discovery of network device 200 with MSF logic 306 by a mobile node (block 602). For example, mobile node 106-1 may discover LER 108-1. In discovering LER 108-1, mobile node 106-1 may receive virtual link layer addresses (e.g., media access control (MAC) addresses) and/or IP addresses that are associated with LER 108-1.

The mobile node may be registered with a LER (block 604). Upon discovering MSFs in LER 108-1, mobile node 106-1 may register itself with MSF logic 306 of LER 108-1. In registering itself with MSF logic 306, mobile node 106-1 may send its IP address and an area ID associated with area 122-1.

A mobility binding for the mobile node may be created and sent to a AMRR (block 606). In one example, LER 108-1 may create a mobility binding for mobile node 106-1, may store the mobility binding, and may send the mobility binding in internal update message 502 to AMRR 114-1. Sending internal update message 502 may initiate an internal update. The mobility binding may include the IP address of mobile node 106-1, router ID of LER 108-1, a mobility label, and an area ID.

The mobility binding may be stored at the AMRR (block 608). In storing the mobility binding, AMRR 114-1 may associate the mobility binding with a record known as "last requester list (LRL)" and an "internal last requester list (iLRL)." The LRL may include a list of area IDs of network devices that have requested the mobility binding for mobile node 106-1. The iLRL may include a list of router IDs of LERs that AMRR aggregates and that have requested the mobility binding.

An ALER may be updated with the mobility binding from the AMRR (block 610). AMRR 114-1 may send the mobility binding to update ALER 112-1. The update may be part of an internal update. When ALER 112-1 receives the mobility binding, ALER 112-1 may allocate a Local Mobility Label that is unique for mobile nodes in area 122-1, and may create and insert a new FIB record 404 into FIB 402. New FIB record 404 may include information that is associated with the mobility binding and the Local Mobility Label, as indicated by various fields in FIB record 404.

AMRR 114-1 may or may not send the LRL, which may be associated with the mobility binding, to ALER 112-1.

External update message 506 may be sent to the AMRR (block 612). ALER 112-1 may send external update message 506, which may carry the Local Mobility Label assigned by ALER 112-1 (see block 606) and a router ID of ALER 112-1, to AMRR 114-1. In response, AMRR 114-1 may store and use the Local Mobility Label and the router ID in responding to requests for mobility bindings.

In the above, when LER 108-1, ALER 112-1, and AMRR 114-1 are fully updated with information related to mobile node 106-1 and the mobility binding, LSP 120-1 may be established. That is, a packet sent from mobile node 106-1 may be relayed via LER 108-1 over LSP 120-1 to ALER 112-1. Conversely, a packet addressed to mobile node 106-1 and arriving at ALER 112-1 from a device that covers a region/area outside area 122-1 may be routed to LER 108-1 via LSP 120-1, to be relayed to mobile node 106-1.

Figure 7:
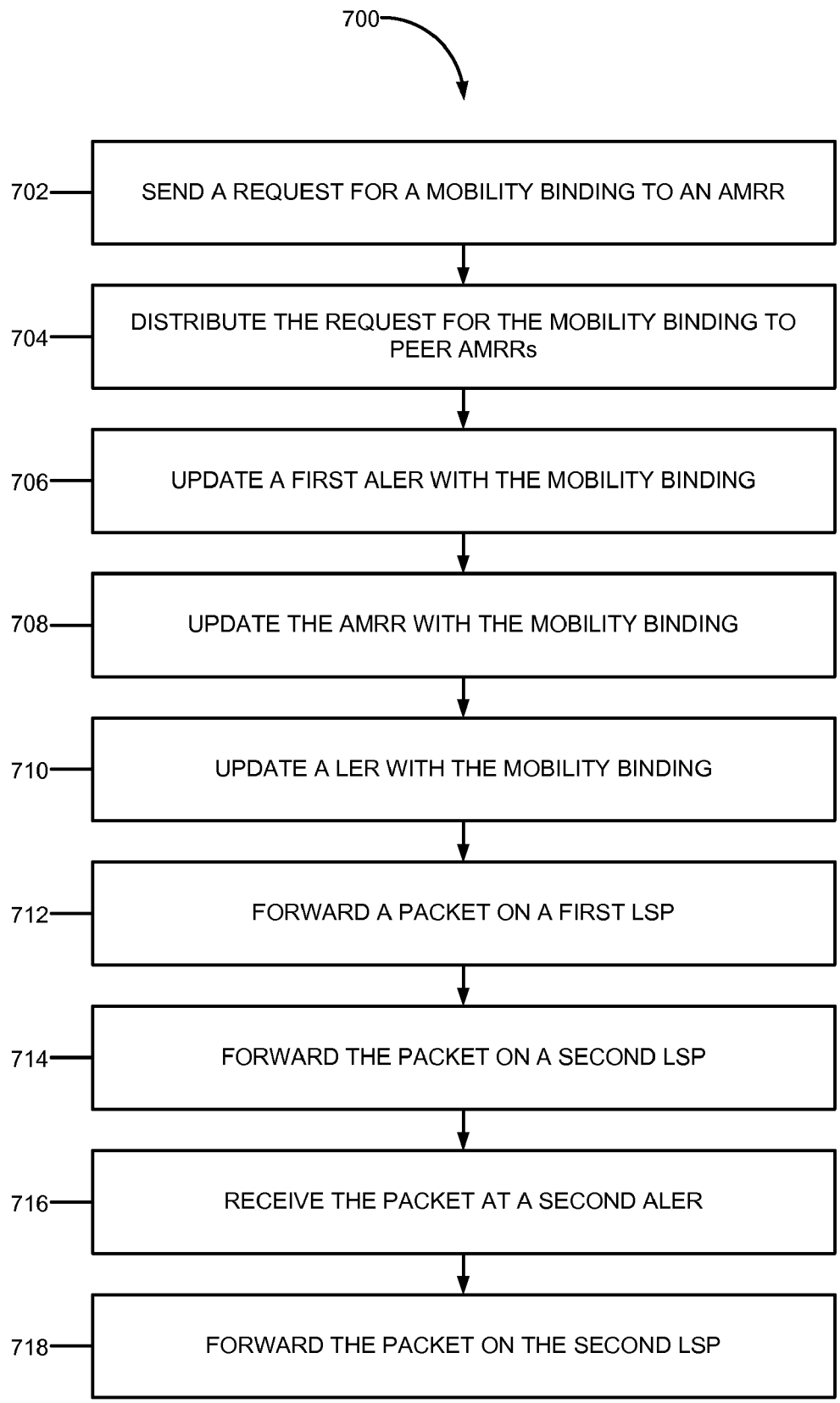
FIG. 7 is a flow diagram of an exemplary process for establishing portions of an exemplary LSP of FIG. 1 and for forwarding a packet over the LSP of FIG. 1.

FIG. 7 is a flow diagram of an exemplary process 700 for establishing LSP 120-2 and LSP 120-3 and for forwarding a packet over LSP 120. Process 700 may include an external update, which is described above in connection with FIG. 5B.

For process 700, it may be assumed that mobile node 106-2 is registered with LER 108-2. In addition, it may be assumed that mobile node 106-2 sends a packet addressed to mobile node 106-1 and that the packet reaches LER 108-3.

Process 700 may begin with sending of a request for a mobility binding to an AMRR (block 702). When LER 108-3 receives the packet from mobile node 106-2, LER 108-3 may determine that the destination IP address in the packet belongs to a range of addresses reserved for mobile nodes, and may look up the IP address in stored mobility bindings. Upon finding no matching mobility binding, LER 108-3 may send a request to AMRR 114-2 for a mobility binding that matches the IP address. LER 108-2 may also send an area ID for area 122-2 in the request.

The request for the mobility binding may be distributed to peer AMRRs (block 704). When AMRR 114-2 receives the request from LER 108-2, AMRR 114-2 may discover that it does not include a mobility binding whose IP address matches the IP address in the request. Consequently, AMRR 114-2 may distribute requests for the mobility binding to peer AMRRs (e.g., AMRR 114-1). When AMRR 114-1 receives a request from AMRR 114-2, AMRR 114-1 may reply with the requested mobility binding.

In providing the mobility binding, AMRR 114-1 may send to AMRR 114-2 several pieces of information, such as an identifier of a router that terminates LSP 120-2 on which the packet will be forwarded. For example, AMRR 114-1 may provide a router ID of ALER 112-1. Other pieces of information that AMRR 114-1 sends may include the Local Mobility Label at ALER 112-1, an area ID (e.g., an area ID for area 122-1), etc. Upon sending the information, AMRR 114-1 may update its LRL with the area ID of AMRR 114-2, which requested the mobility binding. To avoid AMRRs from sending requests that eventually result in a transmission of a request to the AMRR that sent the first request, an AMRR may reply to a request only if the area ID of the requested mobility binding matches the replying AMRR's area ID.

A first ALER may be updated with the mobility binding (block 706). Upon receiving the mobility binding from AMRR 114-1, AMRR 114-2 may provide the mobility binding to ALER 112-2, which, in turn, may be updated with the mobility binding. In response to AMRR 114-2, ALER 112-2 may allocate a Local Mobility Label that is unique within ALER 112-2. In addition, ALER 112-2 may update its FIB 402 using the received mobility binding, in a manner similar to that performed by ALER 112-1 at block 610.

The AMRR may be updated with the mobility binding (block 708). ALER 112-2 may send internal update message 516 to AMRR 114-2 to update AMRR 114-2. Internal update message 516 may carry mobile node 106-1's IP address, the Local Mobility Label assigned by ALER 112-2, and ALER 112-2's router ID as an identifier of the router that terminates/begins LSP 120-3.

A LER may be updated with the mobility binding (block 710). AMRR 114-2 may send the mobility binding to LER 108-3 in response to LER 108-3's request for the mobility binding (see description of block 702). LER 108-3 may update its routing information based on the mobility binding.

A packet at the LER may be forwarded on a first LSP (block 712). To forward the packet, LER 108-3 may insert a label stack in the packet. The label stack may include an outer label, which may be a label associated with a router ID of ALER 112-2 (e.g., a router ID of the router that terminates LSP 120-3), and an inner label, which is the Local Mobility Label provided by the mobility binding from AMRR 114-2. Subsequently, LER 108-3 may send the packet to ALER 112-2 on LSP 120-3.

The packet may be forwarded on a second LSP (block 714). Upon receiving the packet from LER 108-3, ALER 112-2 may pop the outer label, and may look up FIB record 404 by matching the inner label of the packet to the value of Local Mobility Label field 412 of FIB record 404. When a matching FIB record 404 is found, ALER 112-2 may replace the inner label with the value of Current Mobility Label field 414 in FIB record 404. In this case, the value may be equal to the value of the Local Mobility Label assigned to mobile node 106-1 by ALER 112-1. In addition, ALER 112-2 may push the value of Out Top Label field 418 of FIB record 404 onto the label stack of the packet. Once the label stack is set, ALER 112-2 may forward the packet to a destination router identified by the outer label of the label stack (e.g., ALER 112-1).

The packet may be received at a second ALER (block 716). Upon receiving the packet, ALER 112-1 may read the outer label of the label stack in the packet, and may determine that the packet is at a terminating node on LSP 120-2. Consequently, ALER 112-1 may pop the outer label, and use the inner label to look up FIB record 404 in its own FIB 402. When a matching FIB record 404 is found, ALER 112-1 may replace the inner label of the packet with the value of Current Mobility Label field 414 in FIB record 404. In this case, the value may be equal to the value of the mobility label assigned to mobile node 106-1 by LER 108-1. In addition, ALER 112-1 may push the value of Out Top Label field 418 of the FIB record onto the label stack of the packet. If ALER 112-1 performs penultimate hop label popping, the value of Out Top Label field 418 may not be placed onto the label stack of the packet, as implicit null label may be expected at LER 108-1.

The packet may be forwarded on the second LSP (block 718). Upon receiving the packet, LER 108-1 may pop the outer label. If the outer label already has been popped by ALER 112-1 (e.g., the penultimate hop), LER 108-1 may not pop the outer label. In addition, LER 108-1 may read the inner label, which includes the mobility label, and use the inner label to locate records that are generated by MSF logic 306 in LER 108-1. The records may include layer 2 information specific to L2 grooming network 110-1, to which mobile node 106-1 may be attached. The packet may be forwarded on a logical interface associated with L2 grooming network 110-1 and mobile node 106-1. Subsequently, the packet may reach mobile node 106-1 via L2 grooming network 110-1.

Figure 8:
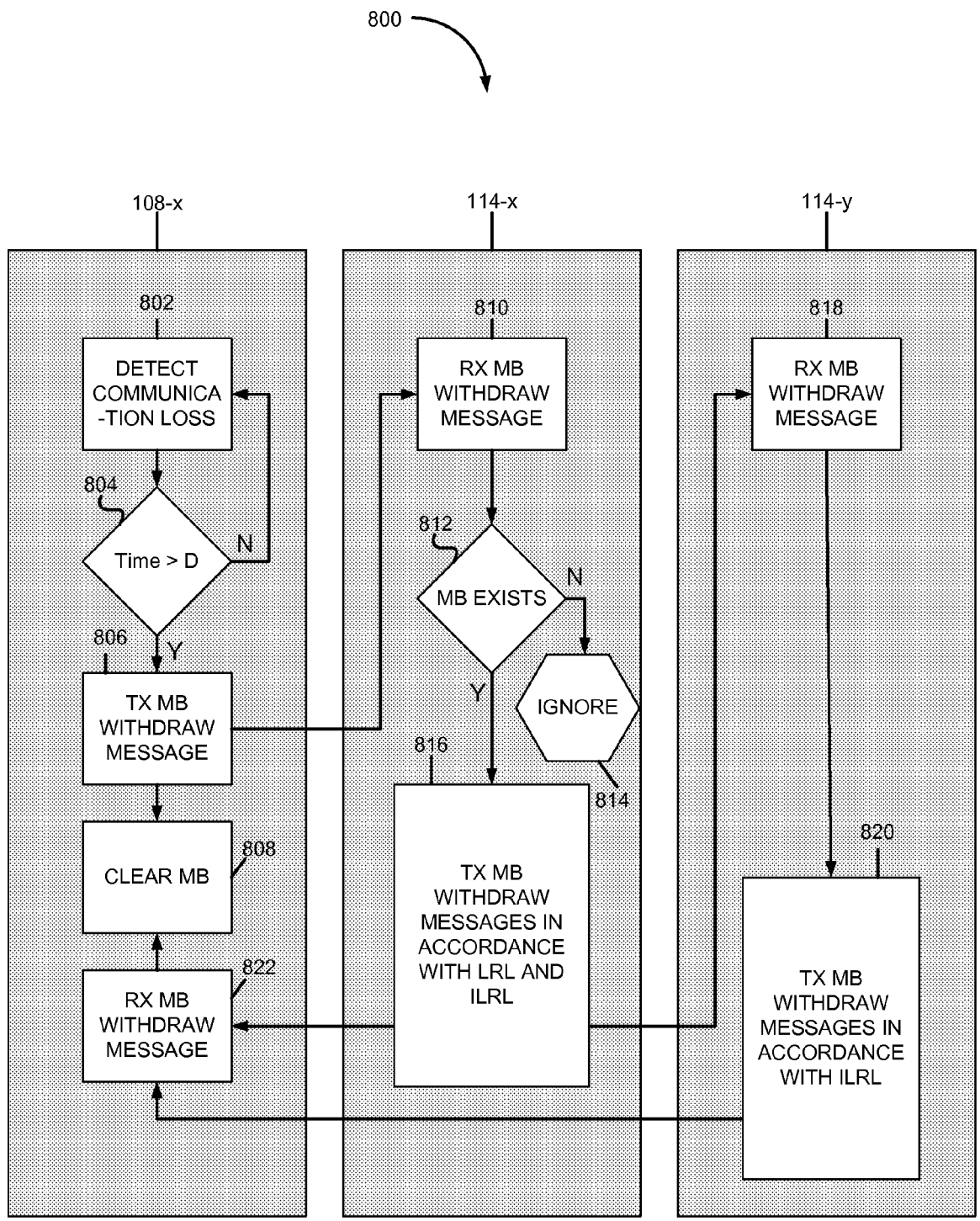
FIG. 8 is a flow diagram of an exemplary process for removing mobility bindings in an exemplary hierarchical mobility label-based network (MLBN) of FIG. 1.

Processes 600 and 700 may establish LSPs 120, and convey packets via LSPs 120. In certain situations, LSPs 120 may be torn down. This may be accomplished by removing mobility bindings from the devices that establish the LSPs. FIG. 8 is a flow diagram of an exemplary process 800 for removing mobility bindings in hierarchical MLBN 104.

Process 800 may begin with detection of a loss in communication at a LER (block 802). For example, LER 108-1 may detect that mobile node 106-1 no longer sends keep-alive messages.

It may be determined whether a time from the moment of the loss in communication exceeds a threshold (block 804). The threshold may be referred to as "dead time (D)." The dead time (D) may be set to be greater than an average time required to register mobile node 106-$x$ (R) and less than the average lifetime of the mobility binding (L). By setting $L \gg D \gg R$, LER 108-$x$ may avoid sending a withdraw message before a re-registration is complete during a handoff, or waiting too long before sending the withdraw message and thus preventing efficient use of system resources. If LER 108-*x* receives a keep-alive message or a packet from mobile node 106-*x* within the dead time, process 800 may return to 802. Otherwise, process 800 may proceed to block 806.

If the threshold is exceeded (block 804—YES), a message that requests a mobile binding be withdrawn may be sent (block 806). For example, LER 108-1 may send a message, herein referred to as either a "mobile binding withdraw message" or "withdraw message," to AMRR 114-1.

The mobile binding may be cleared (block 808). LER 108-*x* may clear any record or information base that pertains to the mobile binding. In addition, LER 108-*x* may remove the registration record for mobile node 106-*x* from LER 108-*x*'s memory.

The mobile binding withdraw message may be received at a first AMRR (block 810). For example, AMRR 114-*x* may receive the mobile binding withdraw message from LER 108-*x*.

Whether a mobility binding that is referred to in the withdraw message exists may be determined (block 812). Upon receiving the withdraw message, AMRR 114-*x* may retrieve a mobility binding based on information provided in the withdraw message. If such mobility binding does not exist, or if a router ID of the mobility binding does not match a router ID of the router that originated the withdrawal (e.g., LER 108-1) (block 812—NO), the first AMRR may ignore the withdraw message (block 814). Otherwise (block 812—YES), process 800 may proceed to block 816.

Withdraw messages may be transmitted in accordance with a LRL and iLRL (block 816). As explained above, the LRL may include a list of area IDs of network devices that have requested the mobility binding for mobile node 106-1, and the iLRL may include a list of router IDs of LERs that an AMRR aggregates and that have requested the mobility binding. AMRR 114-*x* may consult the LRL to identify AMRRs that requested the mobility binding, and send withdraw messages to the AMRRs. In addition, AMRR 114-*x* may send a withdraw message to each of LERs that are listed in the iLRL.

The withdraw message from the first AMRR may be received at a second AMRR (block 818). For example, AMRR 114-*y* may receive the withdraw message from AMRR 114-*x*.

Withdraw messages may be transmitted from the second AMRR in accordance with an iLRL (block 820). When AMRR 114-*y* receives the withdraw message, AMRR 114-*y* may reflect the withdraw message to each of LERs that are listed in the iLRL of AMRR 114-*y*.

A withdraw message may be received at the LER (block 822). When LER 108-*x* receives a withdraw message from AMRR 114-*x* and/or AMRR 114-*y*, process 800 may proceed to block 808 (see above).

FIGS. 6-8 may depict exemplary processes 600-800, where portions of one or more of processes 600-800 may involve managing area IDs. FIGS. 9A through 10B illustrate flow diagrams of exemplary processes for managing area IDs within one or more of processes 600-800.

Figure 9A:
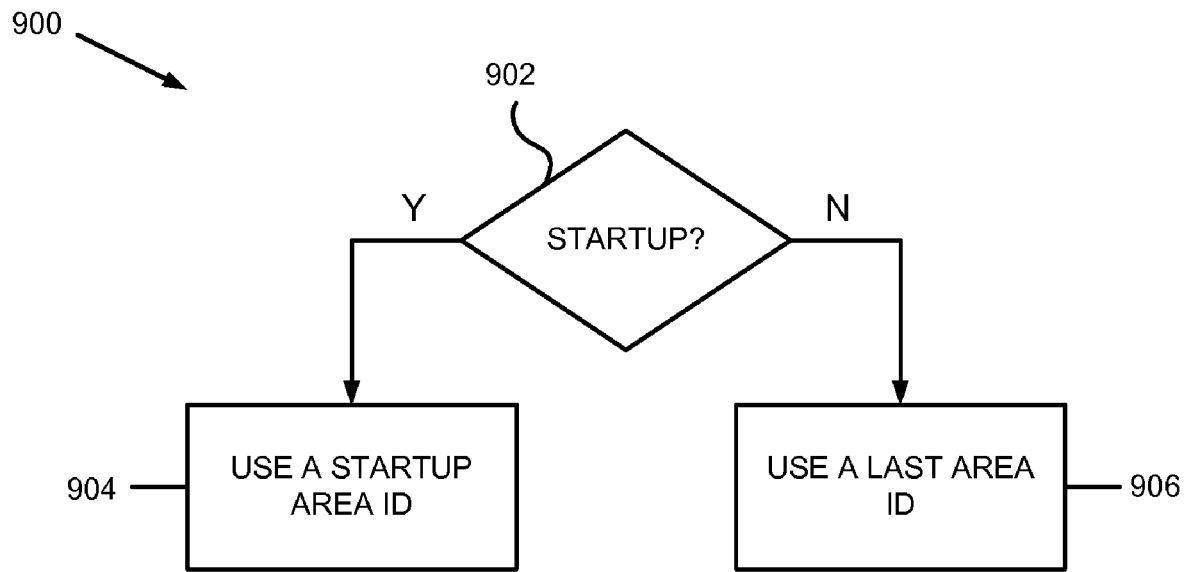
FIG. 9A is a flow diagram of an exemplary process for managing an area identifier (ID) in a mobile node of FIG. 1.

FIG. 9A is a flow diagram of a process 900 for managing an area ID at mobile node 106-*x*. Process 900 may begin with a determination of whether mobile node 106-*x* is at a startup state (block 902).

If mobile node 106-*x* is at the startup state (block 902—YES), mobile node 106-*x* may use a startup area ID (block 904). The startup area ID may include a pre-determined ID that mobile node 106-*x* may communicate to LER 108-*x* upon its startup. The startup area ID may not include the ID of an area within which mobile node 106-*x* is located or any other area ID used in the hierarchical MLBN. For example, the startup area ID may be equal to 0.

If mobile node 106-*x* is not at the startup state (block 902—NO), mobile node 106-*x* may use the area ID of the last visited area (block 906). That is, in interacting with LER 108-*x*, mobile node 106-*x* may provide the area ID of the last visited area to LER 108-*x*.

Figure 9B:
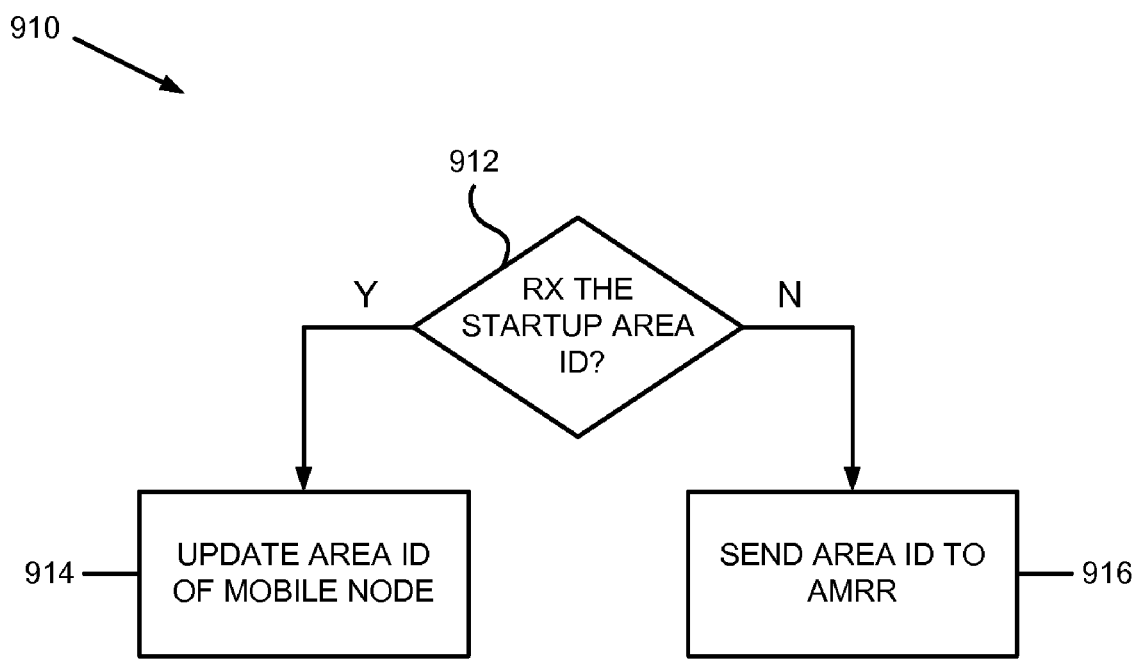
FIG. 9B is a flow diagram of an exemplary process for managing an area ID in a label edge router (LER) of FIG. 1.

FIG. 9B is a flow diagram of a process 910 for managing an area ID at LER 108-*x*. Process 910 may begin with a determination, by LER 108-*x*, of whether an area ID received from mobile node 106-*x* is the startup area ID (block 912).

If the received area ID is the startup area ID (block 912—YES), an area ID may be updated at mobile node 106-*x* (block 914). LER 108-*x* may send, to mobile node 106-*x*, the area ID of the area in which a region associated with LER 108-*x* is located. Mobile node 106-*x* may update the area ID in mobile node 106-*x*'s memory, and may use the area ID in subsequent communication with LER 108-*x*.

If the received area ID is not the startup area ID (block 912—NO), LER 108-*x* may send the area ID to AMRR 114-*x* during an internal update (block 916).

Figure 10A:
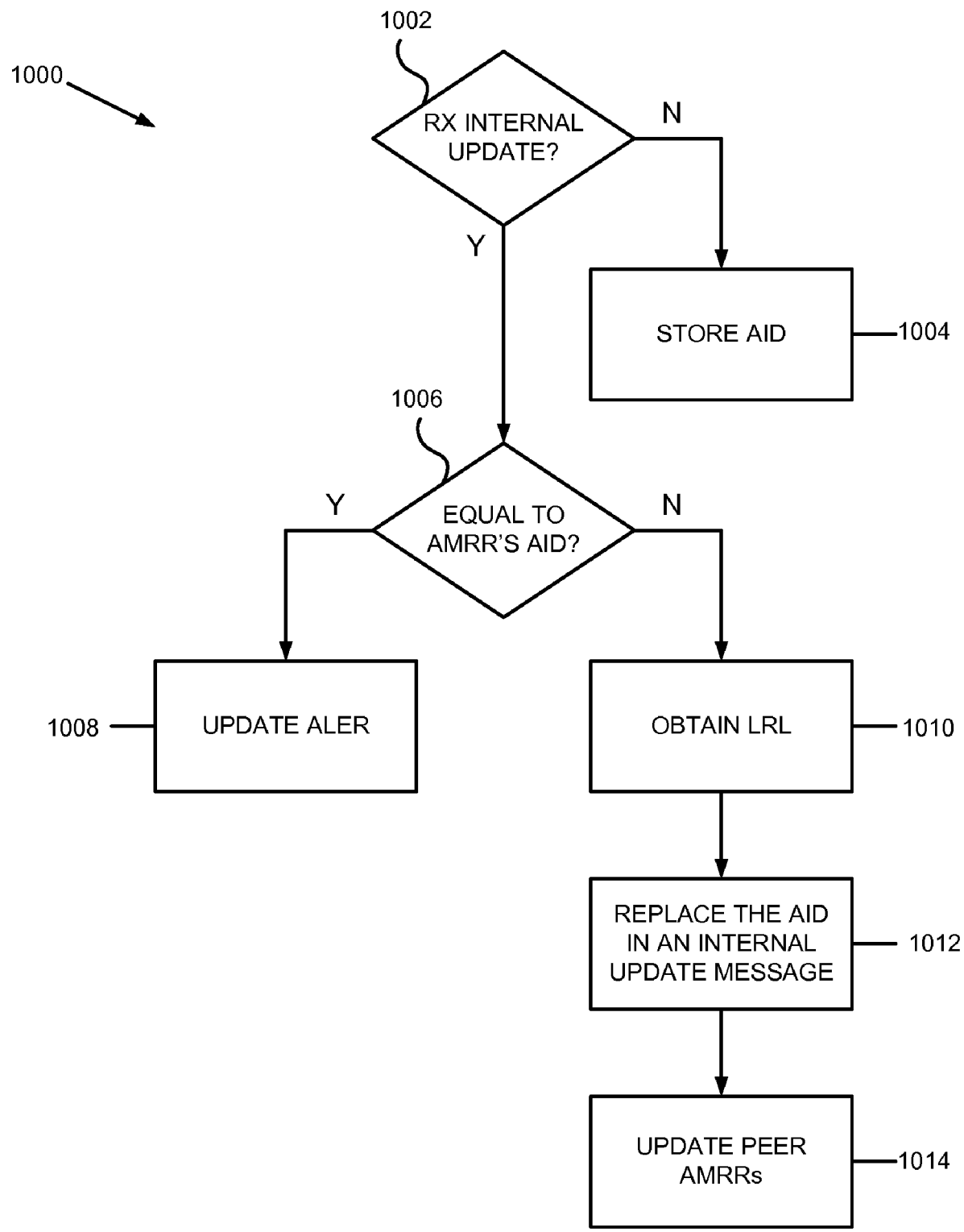
FIG. 10A is a flow diagram of an exemplary process for managing an area ID in an exemplary area mobility route reflector (AMRR) of FIG. 1.

FIG. 10A is a flow diagram of a process 1000 for managing an area ID at AMRR 114-*x*. Process 1000 may begin with a determination of whether an area ID is received in an internal update message (block 1002). If the area ID is received in an external update message (block 1004—NO), the area ID may be stored as part of records related to mobility bindings (block 1004).

If the area ID is received in an internal message (block 1004—YES), it may be determined whether the received area ID is equal to the area ID of AMRR 114-*x* (block 1006). If the area ID is equal to the area ID of AMRR 114-*x* (block 1006—YES), AMRR 114-*x* may update ALER 112-*x* with the received mobility binding (block 1008). Otherwise (block 1006-NO), a LRL may be obtained at AMRR 114-*x* (block 1010). To obtain the LRL, AMRR 114-*x* may send a request for the LRL to an AMRR that is associated with the area ID in the received internal update message.

AMRR 114-*x* may replace the area ID in an internal update message with its own area ID and (block 1012). In addition, AMRR 114-*x* may send the internal update message to ALER 112-*x*.

Peer AMRRs may be updated in accordance with the LRL (block 1014). When AMRR 114-*x* receives the LRL from the AMRR to which AMRR 114-*x* sends the request for the LRL, AMRR 114-*x* may send the mobility binding to update peer AMRRs that correspond to the area IDs listed in the LRL.

Figure 10B:
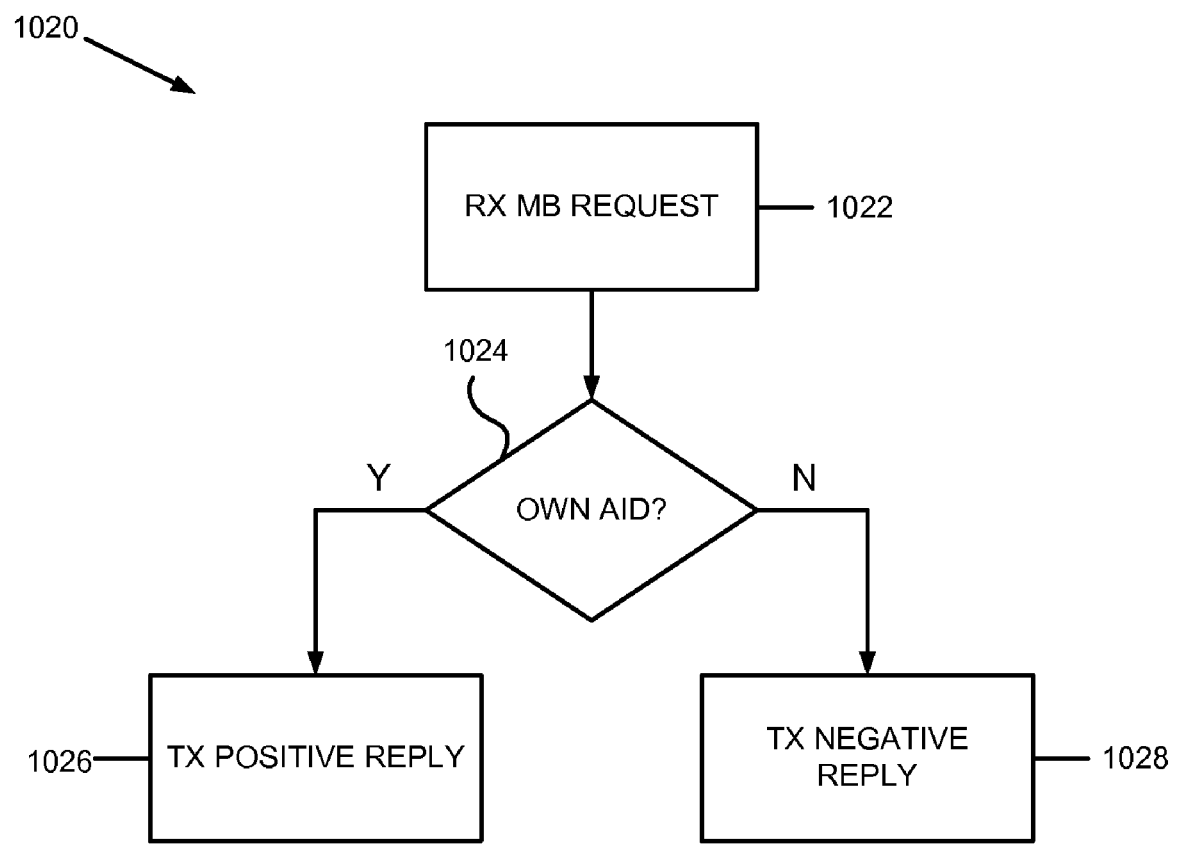
FIG. 10B is a flow diagram of another exemplary process for managing an area ID at the AMRR of FIG. 1.

FIG. 10B is a flow diagram of another process 1020 for managing an area ID at AMRR 114-*x*. Process 1020 may begin with receipt, at AMRR 114-*x*, of a request for a mobility binding from a peer AMRR (block 1022).

It may be determined if an area ID of the requested mobility binding is AMRR 114-*x*'s own area ID (block 1024). When AMRR 114-*x* receives the request for the mobility binding, AMRR 114-*x* may compare the area ID of the requested mobility binding at AMRR 114-*x* to the area ID of AMRR 114-*x*. If the area IDs are equal (block 1024 YES), AMRR 114-*x* may transmit a positive reply (e.g., a reply with the mobility binding) (block 1026). Otherwise (block 1024—NO), a negative reply (e.g., a reply that does not include the mobility binding) may be sent to the peer AMRR (block 1028).

The above paragraphs describe exemplary processes that may be performed by one or more of devices in hierarchical MLBN 104 to establish, modify, remove, and/or use LSPs. The exemplary processes in hierarchical MLBN 104 may be scalable, as devices that are illustrated in FIG. 1 may distribute processing load over many devices. In part, such capability in hierarchical MLBN 104 may be attributable to AMRRs 114, each of which may act as a centralized control plane node covering an area. As described above, in acting as a control plane node, AMRR 114-x may reflect internal updates from LERs 108 to ALER 112-x, reflecting external updates from outside the mobility area to ALER 112-x, processing internal updates from ALER 112-x, and generating mobility bindings and LRL requests/replies.

The ability to distribute processing load may also be attributable to segmentation of LSPs. For example, if there is a change in LSP 120-x, devices in hierarchical MLBN 104 may need to be updated with information only to the extent necessary to modify LSPs 120 that are affected by the change. When mobile node 106-1 moves from region 118-1 to region 118-2, a new LSP (not shown) that extends from LER 108-2 to ALER 112-1 may replace LSP 120-1. LSPs 120-2 and 120-3 may not be affected, and the devices in hierarchical MLBN 104 may not be updated with unnecessary information (e.g., information that pertains to LSPs 120-2 and 120-3).

For each of LSPs 120 to be relatively independent of other LSPs 120, a packet that passes through LSP 120-x may carry a Local Mobility Label that is unaffected by allocation of mobility labels in other LSPs 120. That is, a Local Mobility Label may be scoped within a LSP segment (e.g., LSP 120-1, 120-2, etc.).

The foregoing description of implementations provides illustration, but is not intended to be exhaustive or to limit the implementations to the precise form disclosed. Modifications and variations are possible in light of the above teachings or may be acquired from practice of the teachings.

For example, while series of blocks have been described with regard to exemplary processes illustrated in FIGS. 6-10B, the order of the blocks may be modified in other implementations. In addition, non-dependent blocks may represent acts that can be performed in parallel to other blocks.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Further, certain portions of the implementations have been described as "logic" that performs one or more functions. This logic may include hardware, such as a processor, an application specific integrated circuit, or a field programmable gate array, software, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the implementations described herein unless explicitly described as such. Also, as used herein, the article "a" is intended to include one or more items. Where one item is intended, the term "one" or similar language is used. Further, the phrase "based on" is intended to mean "based, at least in part, on" unless explicitly stated otherwise.

The Appendix (attached herewith and including 17 pages) provides additional details regarding the embodiments described herein.

What is claimed is:

1. A method comprising:
   establishing a first segment of a label switched path between a first label edge router and a first area label edge router, including:
      creating, at the first label edge router, a mobility binding for a mobile node registered at the first label edge router,
      sending, from the first label edge router to a first route reflector, the mobility binding in an internal update message,
      associating, at the first route reflector, the mobility binding with a last requester list (LRL) that includes a list of area identifiers of network devices associated with requests for the mobility binding and with an internal LRL that includes a list of router identifiers of label edge routers associated with requests for the mobility binding,
      reflecting, at the first route reflector, the mobility binding to the first area label edge router,
      allocating, for the mobile node, a local mobility label that is unique for mobile nodes in an area of the first area label edge router,
      modifying, at the first area label edge router, the mobility binding by substituting a mobility label in the mobility binding with the local mobility label, and
      sending, from the first area label edge router, the modified mobility binding to the first route reflector;
   establishing a second segment of the label switched path between a second label edge router and a second area label edge router;
   receiving, from the mobile node, a packet at the second label edge router;
   forwarding, via the second segment of the label switched path, the packet from the second label edge router to the second area label edge router;
   determining, at the second area label edge router, whether a third segment of the label switched path exists between the first area label edge router and the second area label edge router;
   establishing the third segment of the label switched path, between the first area label edge router and the second area label edge router, when the second area label edge router determines that the third segment of the label switched path does not yet exist;
   forwarding the packet from the second area label edge router to the first area label edge router over the third segment of the label switched path; and
   forwarding, via the first segment of the label switched path, the packet from the first area label edge router to the first label edge router.

2. The method of claim 1, wherein reflecting the mobility binding does not include sending the LRL, and wherein establishing a third segment of the label switched path includes:
   propagating the modified mobility binding from the first route reflector to a second route reflector that is associated with the second area label edge router; and
   updating the second area label edge router with the modified mobility binding.

3. A method comprising:
   storing, in a memory of a first label edge router, a registration record for a first mobile node;

creating a mobility binding for the first mobile node at the first label edge router;
sending, from the first label edge router to a first route reflector, the mobility binding in an internal update message;
reflecting, at the first route reflector, the mobility binding to a first area label edge router to establish a first label switched path;
sending an external update message from the first area label edge router to the first route reflector to update the mobility binding;
detecting, at the first label edge router, a period of time in which no communications are received from the first mobile node;
determining whether the period of time exceeds a threshold value; and
removing, when the duration exceeds the threshold value, the first label switched path, including:
removing the registration record from the memory of the first label edge router,
consulting, at the first route reflector, a list of area identifiers of network devices associated with requests for the mobility binding, to identify at least a second route reflector associated with the network devices, and
sending, from the first route reflector, withdraw messages to the at least second route reflector.

4. The method of claim 3, further comprising:
sending a request for the mobility binding from a second label edge router to a second route reflector;
obtaining the mobility binding at the second route reflector from the first route reflector;
sending the mobility binding from the second route reflector to a second area label edge router to establish a second label switched path between the first area label edge router and the second area label edge router; and
establishing a third label switched path between the second area label edge router and the second label edge router.

5. The method of claim 4, where sending the mobility binding from the second route reflector to a second area label edge router includes:
allocating a local mobility label for the first mobile node; and
updating a forwarding information base of the second area label edge router.

6. The method of claim 4, further comprising:
receiving a packet from a second mobile node; and
forwarding the packet from the second mobile node to the first mobile node.

7. The method of claim 6, where forwarding the packet from the second mobile node to the first mobile node includes:
forwarding the packet over the third label switched path;
forwarding the packet over the second label switched path; and
forwarding the packet over the first label switched path.

8. The method of claim 3, where sending, from the first label edge router to a first route reflector, the mobility binding in an internal update message includes:
sending, from the first label edge router to the first route reflector, an association between a mobility label of the first mobile node and at least one of an Internet Protocol (IP) address of the first mobile node, an area identifier of the first mobile node, or a router identifier associated with the first label edge router.

9. The method of claim 3, where reflecting the mobility binding includes:
causing the first area label edge router to allocate a local mobility label for the first mobile node.

10. The method of claim 9, further comprising:
allocating, at the first label edge router, a forwarding information base record that includes the local mobility label and at least one of a router identifier, an identifier associated with an egress line card, or an Internet Protocol address prefix associated with the first mobile node.

11. The method of claim 3, where registering a first mobile node includes at least one of:
receiving, at the first label edge router, a starting area identifier from the first mobile node; and
sending, from the first label edge router, an area identifier of an area that includes a region of the first label edge router and causes the first mobile node to replace the starting area identifier with the area identifier.

12. The method of claim 11, where sending, from the first label edge router, an area identifier includes:
sending a predetermined value from the first mobile node to the first label edge router when the first mobile node is in a starting state.

13. The method of claim 3, where registering a first mobile node includes at least one of:
sending an Internet Protocol address of the first mobile node to the first label edge router.

14. The method of claim 3, further comprising:
selecting a value for the threshold value that is longer than an average lifetime of mobility bindings and shorter than an average time taken by mobile nodes to register.

15. A system comprising:
a label edge router, associated with a geographical region, configured to:
register a first mobile node,
create a mobility binding for the first mobile node, and
send a first internal update message that includes the mobility binding to initiate an internal update;
an area label edge router, associated with an area that includes the geographical region, configured to:
receive a second internal update message that carries contents of the first internal update message;
update a forwarding information base based on the second internal update message to establish a first label switched path between the label edge router and the area label edge router,
send an external update message, and
aggregate the label edge router and one or more additional label edge routers whose corresponding regions are in an area associated with the area label edge router; and
a route reflector, associated with the area, configured to:
receive the first internal update message,
associate the mobility binding with a first record including a list of area identifiers of network devices associated with requests for the mobility binding and with a second record including a list of router identifiers of label edge routers associated with the requests for the mobility binding;
send the second internal update message to the area label edge router,
receive the external update message from the area label edge router, and
generate, using the external update message, responses to the requests for the mobility binding associated with the first and second records.

16. The system of claim 15, where the route reflector is configured to provide the mobility binding upon a demand from a network device.

17. The system of claim 15, where the route reflector is configured to use Multi-Protocol Border Gateway Protocol (MP-BGP).

18. The system of claim 15, where the area label edge router is further configured to:
   receive a packet that includes a label stack;
   remove a top label of the label stack in the packet;
   look up a forwarding information base record by matching a mobility label of the packet to a value of a field of the forwarding information base record;
   replace the mobility label in the packet with a value of another field of the forwarding information base record; and
   forward the packet toward a destination device.

19. A device comprising:
   one or more processors configured to:
      receive a request to update a mobility binding, associated with a mobile node, based on a mobility label;
      reflect the request to an area label edge router that manages a plurality of edge routers in a network;
      receive from the area label edge router, in response to the reflected request, a local mobility label to be used as a substitute for the mobility label in a router that is not one of the plurality of edge routers;
      send the local mobility label to the router;
      when, for a particular period of time keep-alive messages are not received at the router from the mobile node, send a first withdraw message to route reflectors whose area identifiers are provided in a last requester list (LRL) including area identifiers associated with requests received at the device for the mobility binding; and
      send a second withdraw message to label edge routers that requested the mobility binding from the device, the label edge routers being aggregated by the device and listed in an internal LRL associated with the mobility binding.

* * * * *